United States Patent
Oiwa

[11] Patent Number: 5,184,539
[45] Date of Patent: Feb. 9, 1993

[54] FRYER

[75] Inventor: Masatoshi Oiwa, Nagoya, Japan

[73] Assignee: Meito Corporation, Nagoya, Japan

[21] Appl. No.: 801,566

[22] Filed: Dec. 2, 1991

[51] Int. Cl.$^5$ .............................................. A47J 37/12
[52] U.S. Cl. ........................................ 99/408; 99/403; 126/391
[58] Field of Search ................... 99/403, 408; 126/391

[56] References Cited

U.S. PATENT DOCUMENTS

| | | | |
|---|---|---|---|
| 1,907,265 | 5/1933 | Schwedersky | 99/408 |
| 1,923,639 | 8/1933 | O'Dowd | 126/391 |
| 2,305,039 | 12/1942 | Stead | 99/408 |
| 2,354,487 | 7/1944 | Thompson | 99/408 |
| 2,535,905 | 12/1950 | Dawson | 126/391 |
| 2,652,767 | 9/1953 | Childs | 99/408 |
| 2,666,427 | 1/1954 | Keating | 126/391 |
| 3,217,633 | 11/1965 | Anetsberger | 99/408 |
| 3,263,596 | 8/1966 | Thomas | 126/391 |
| 4,550,711 | 11/1985 | Griffiths | 126/391 |
| 4,913,041 | 4/1990 | Taber et al. | 126/391 |
| 4,913,042 | 4/1990 | Miller | 99/408 |

FOREIGN PATENT DOCUMENTS

| | | | |
|---|---|---|---|
| 125750 | 11/1984 | European Pat. Off. | 99/403 |
| 2267730 | 11/1975 | France | 99/403 |
| 2570942 | 4/1986 | France | 99/403 |
| 8555 | 1/1986 | Japan | 99/403 |
| 1-9895 | 4/1989 | Japan | 99/403 |

*Primary Examiner*—Harvey C. Hornsby
*Assistant Examiner*—Mark Spisich
*Attorney, Agent, or Firm*—Nikaido, Marmelstein, Murray & Oram

[57] ABSTRACT

The invention relates to a fryer capable of automatically collecting fried scums. The fryer has an oil tank capable of containing frying oil and having a bottom inner tank and a bottom outer tank protruding downwardly to surround through a flue the bottom inner tank, a combustion chamber provided under the oil tank, a fried scum filter provided in the upper portion of the oil tank for collecting fried scum, and an oil pump device provided between the lower portion of the bottom outer tank and the upper portion of the oil tank.

7 Claims, 2 Drawing Sheets

FRYER

BACKGROUND OF THE INVENTION (1) Field of the Invention

This invention relates to a fryer capable of automatically collecting fried scums.

(2) Description of the Prior Art

A fryer for producing fried food in a large quantity is generally constructed to contain frying oil in an oil tank of a deep bottom and to heat the tank by a burner or the like.

In such a conventional fryer, fried scums produced at the time of frying food are floated in frying oil. There arises a problem that the fried scums are adhered to the material of food to be fried newly thrown in the oil so as to deteriorate the color-tone and quality of fried food.

SUMMARY OF THE INVENTION

Accordingly, an object of this invention is to provide a fryer which eliminates the above-described problem and can automatically collect fried scums floated in frying oil.

In order to achieve this and other objects, there is provided according to this invention a fryer which has a bottom inner tank provided above a combustion chamber and protruding downwardly at a center of the bottom of an oil tank capable of containing frying oil, a bottom outer tank protruding downwardly to surround the bottom inner tank through an inner flue and an outer flue in such a manner that the inner tank is connected to the outer tank via connection tubes at the lower portions, a fried scum filter arranged in the upper portion of the outer tank for collecting fried scums, and oil circulating means having a filtering material between the lower portion of the outer tank and the upper portion of the oil tank.

According to this invention, the frying oil heated in the bottom inner tank is raised, and advanced to the outer peripheral side of the oil tank at a relatively low temperature through the vicinity of the oil surface. The frying oil is advanced to the outer tank, and circulated from the lower portion through the connection tubes to the bottom inner tank.

At this time, fried scums floated in the frying oil in the upper portion of the outer tank are blocked to be curculated by the fried scum filter and collected.

The oil circulating means collects the frying oil from the lower portion of the outer tank, filters to remove the fine scums included in the frying oil by the filtering material, and circulates the purified frying oil into the oil tank.

The fryer of this invention is arranged as described above to form a frying oil circulating passage of the bottom inner tank and the bottom outer tank provided in the bottom of the oil tank and the connection tubes for connecting the lower portions of both the tanks, and guides the fried scums into the fried scum filter by means of convection of the frying oil. Thus, the fried scums floated in the frying oil can be automatically collected. Therefore, even if a large quantity of fried food is produced, the fried scums are not adhered to the material of food to be fried and newly thrown to prevent the color tone and the finishing quality of the fried food from decreasing.

Since the fine scums mixed in the frying oil are filtered by the oil circulating means and the frying oil is circulated to the oil tank as purified oil, in addition to the effect of the fried scum filter, the color tone and finishing quality of the fried foods can be maintained at an optimum level.

Further, since the bottom inner and outer tanks are formed in the bottom of the oil tank and the inner and outer flues are provided therebetween to be heated, its heat exchanging area can be increased to obtain high thermal efficiency. Since exhausting temperature can be lowered to 200°-250° C. as compared with 350°-400° C. of a conventional one, this invention can provide an effect of preventing the frying oil from igniting by the exhaust temperature.

DESCRIPTION OF THE PREFERRED EMBODIMENT

Figure 1:
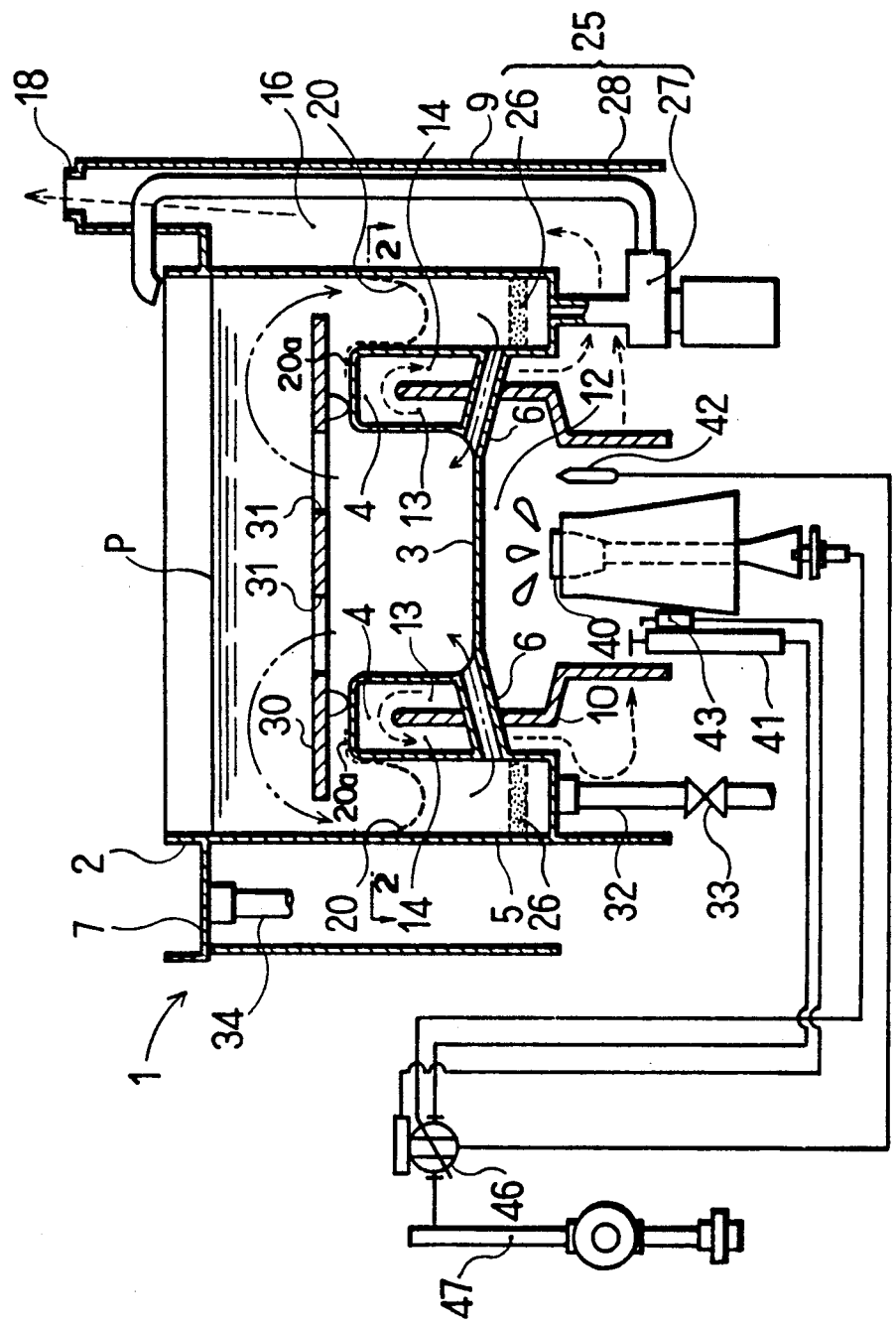
FIG. 1 is a sectional view of an arrangement of an embodiment of this invention.

An embodiment of this invention will now be described with reference to the accompanying drawings.

A fryer 1 comprises an oil tank 2 having a bottom inner tank 3 and a bottom outer tank 5 in its bottom, a flue 4 formed between the inner tank 3 and the outer tank 5, a combustion chamber 12 provided under the inner tank 3, a fried scum filter 20 provided at the upper portion of the outer tank 5, and oil circulating means 25 having a tube 28 provided between the outer tank 5 and the upper portion of the oil tank 2.

The oil tank 2 is formed, in the embodiment, in a rectangular parallelepiped shape of a profile, and with the circular bottom inner tank 3 forming a central bottom position of the tank 2. The outer tank 5 is formed to surround the outer periphery of the inner tank 3 and has a rectangular parallelepiped shape protruding downwardly from the central bottom portion forming inner tank 3. The lower portion of the outer tank 5 is connected to the lower portion of the inner tank 3 via a plurality of connection tubes 6. A ceiling plate 7 is provided at the outer upper periphery of the oil tank 2, and a heat insulation wall 9 is provided under the ceiling plate 7 so as to surround the side and lower portions of the oil tank 2 and to form a flue 16 to the oil tank 2. An exhaust cylinder 18 for exhausting gas is provided at a predetermined position of the heat insulation wall 9.

A stepped cylindrical combustion cylinder 10 surrounding the inner tank 3 at a predetermined interval is arranged in the flue 4. The combustion cylinder 10 is formed of zirconia ceramics which can radiate a far infrared ray when the cylinder 10 is heated, and a combustion chamber 12 is formed between the cylinder 10 and the bottom of the inner tank 3. An inner flue 13 is formed between the combustion cylinder 10 and the sidewall of the inner tank 3, an outer flue 14 connected to the inner flue 13 is formed between the combustion cylinder 10 and the outer tank 5, and gases from the flue 14 are drawn upwardly through the flue 16.

The fried scum filter 20 is formed, in the embodiment, of a metal gauze having approximately 30 meshes, and removably supported by an edge 20a at the upper portion of the outer tank 5 so as to cover the entire area between the outer wall of the flue 14 and the outer tank 5.

A filtering material 26 for forming a portion of oil circulating means 25 is arranged at a position lower than the mounting position of the connection tube 6 in the lower portion of the outer tank 5.

The oil circulating means 25 has the filtering material 26 formed of porous ceramics having approximately 50−30μ of nominal filtration degree, an oil pump 27 connected to the bottom of the outer tank 5, and an oil circulation tube 28 connected to an outlet of the oil pump 27 for circulating frying oil P to the upper portion of the oil tank 2.

A deflector 30 made of zirconia ceramics which can radiate a far infrared ray is horizontally arranged at a predetermined interval to the inner wall of the oil tank 2 at a predetermined position in the oil tank 2. A through hole 31 for accelerating convection of the frying oil P is perforated at a predetermined position at the deflector 30.

A conduit 32 having an oil exhaust valve 33 for exhausting the frying oil P is provided in the bottom of the outer tank 5, and a conduit 34 for exhausting the overflowed frying oil P is provided at the ceiling plate 7.

On the other hand, a secondary air guide main burner 40 and a pilot burner 41, a fizzle (half-burnt) preventive sensor 42 are provided in the combustion chamber 12, which are respectively connected through gas cock 46 to a gas supply tube 47. A spark ignitor 43 is provided to ignite the pilot burner 41.

Then, the operation of the fryer arranged as described above will be described.

When the main burner 40 of the combustion chamber 12 is ignited, its flame heats the bottom surface of the inner tank 3. Further, high temperature combustion gas thus generated is exhausted through the inner flue 13 and the outer flue 14 and the flue 16 from the exhaust cylinder 18 while gradually falling in temperature.

At this time, wide heating areas from the bottom surface to the sidewall of the inner tank 3, and from the inside wall to the bottom surface and outside wall of the outer tank 4 are obtained. The combustion cylinder 10 is heated to a high temperature to radiate far infrared rays from the inner and outer walls, the heat of the radiated far infrared rays is superposed on the heat of the high temperature combustion gas to heat the inner and outer tanks 3 and 5.

On the other hand, the frying oil P heated in the inner tank 3 is fed upwardly via the through hole 31 of the deflector 30 to the vicinity of the oil surface level to flow toward the sidewall of the oil tank 2. A material of food with a coating is thrown in the oil in the upper portion in the oil tank 2, fried, and fried scums produced at this time are floated in the frying oil P. The frying oil P moved to the sidewall of the oil tank 2 at a relatively low temperature is slightly lowered at its temperature to flow down to become a down stream. The down stream of the frying oil P is fed down between the deflector 30 and the sidewall of the oil tank 2, and advanced into the outer tank 5.

At this time, the fried scums floated in the frying oil P are collected by the fried scum filter 20, and stay in the filter 20. The frying oil P in which the fried scums are thus removed is circulated from the lower portion of the outer tank 5 through the connection tube 6 to the inner tank 3, and again heated by the highest temperature portion by the combustion chamber 12. The deflector 30 radiates far infrared ray upon heating to improve its thermal efficiency and regulates the convection passage of the frying oil P.

As described above, the circulating passage of the frying oil P to be circulated from the inner tank 3 through the outer tank 5 to the inner tank 3 is formed upon heating, and the fried scums are guided into the fried scum filter 20 by means of the convection of the frying oil P to be automatically removed. Fine scums which cannot be removed by the fried scum filter 20 are filtered by the filtering material 26 of the oil circulating means 25 to purify the frying oil P, and the resultant oil P is circulated into the oil tank 2.

Figure 2:
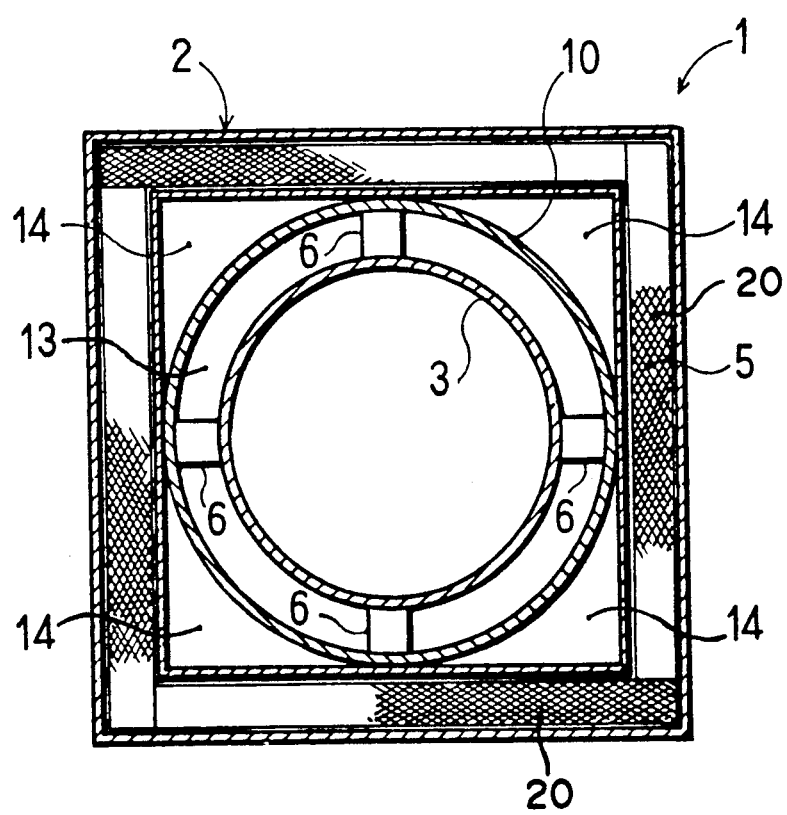
FIG. 2 is 4e sectional view taken along a line 2—2 of FIG. 1.

In the embodiment described above, the shape of the combustion cylinder 10 is formed to have a relation of an inner contact circle with the outer tank 5. Therefore, the plane shape of the outer flue 14 is formed to be large at the inner corners of the outer tank 5 (see FIG. 2), thereby performing an effect that the lateral width and depth sides of the oil tank 2 can be reduced without disturbing the flue effect. Further, the oil pump 27 and the circulating tube 28 are provided in the flue 16 to perform an effect that solidification of the frying oil P is prevented in the circulating tube.

This invention is not limited to the above description and illustrated embodiment, and various changes and modifications may be made without departing from the spirit and scope of the present invention. For example, an oil tank for temporarily storing frying oil P in a circulating tube 28 may be provided.

It is, of course, possible to form the plane shape of the flue 4 of the outer tank 5 in a circular shape.

What is claimed is:

1. Apparatus for frying food in heated oil, for removing fried scum from the oil and for recirculating substantially scum-free oil, said apparatus comprising:

an oil tank for containing frying oil and comprising an upper portion in which frying is carried out and a lower portion comprising a bottom inner tank forming a central, circular bottom portion of the tank, and a lower bottom outer tank portion surrounding said bottom inner tank and forming a flue means between said bottom outer tank portion and said bottom inner tank;

a fuel burner under said bottom inner tank and connected to a source of fuel;

a combustion cylinder surrounding said burner and extending upwardly partially into said flue means and dividing said flue means into an inner flue chamber and an outer flue chamber for passage therethrough of hot combustion gas to heat oil in adjacent portions of the tank;

tube means interconnecting said bottom inner tank and said lower bottom outer tank portion at a position above a bottom wall thereof;

oil circulating means to circulate oil from said lower bottom outer tank portion to said upper portion of said tank;

a primary filtering means disposed in a space between said outer flue chamber and an outer wall of said lower bottom outer tank portion to filter large particles of fried scum from the recirculating oil; and a secondary filtering means disposed in said lower bottom outer tank portion at a position above the bottom wall thereof and below said tube means for filtering smaller particles of fried scum from the recirculating oil.

2. A fryer apparatus according to claim 1, wherein said oil tank comprises a deflector mounted in said tank above said bottom inner tank and below the surface of frying oil in said upper portion of said tank for accelerating convection of frying oil within said tank.

3. A fryer apparatus according to claim 2, wherein said deflector comprises a plate having at least one hole at a position above said bottom inner tank with a peripheral edge of said plate spaced from a surrounding wall of said upper portion of said tank.

4. A fryer apparatus according to claim 2, wherein said deflector is formed of a ceramic material that radiates a far infrared ray upon heating.

5. A fryer apparatus according to claim 1, wherein said primary filter is removable for disposal of accumulated scum.

6. A fryer apparatus according to claim 1, wherein said combustion cylinder is formed of a ceramic material that radiates a far infrared ray upon heating.

7. A fryer apparatus according to claim 1, wherein said oil circulating means includes an oil tank for temporarily storing frying oil.

* * * * *